United States Patent [19]

Brienza et al.

[11] 4,166,423
[45] Sep. 4, 1979

[54] ADAPTIVE SEWING MACHINE

[75] Inventors: Michael J. Brienza, Westport, Conn.; Stephen A. Garron, Elizabeth; Robert Sedlatschek, Bridgewater, both of N.J.

[73] Assignee: The Singer Company, New York, N.Y.

[21] Appl. No.: 881,995

[22] Filed: Feb. 28, 1978

[51] Int. Cl.² ............................................. D05B 47/04
[52] U.S. Cl. ................................ 112/254; 112/158 E; 112/278
[58] Field of Search .......... 112/254, 255, 278, 121.11, 112/158 E, 205; 66/8

[56] References Cited

U.S. PATENT DOCUMENTS

| | | | |
|---|---|---|---|
| 3,722,439 | 3/1973 | Newman | 112/254 |
| 3,877,405 | 4/1975 | Dorosz et al. | 112/255 |
| 3,970,017 | 7/1976 | Babson et al. | 112/205 X |
| 3,995,450 | 12/1976 | Rozett | 66/8 |
| 4,048,932 | 9/1977 | Odermann et al. | 112/158 E |

*Primary Examiner*—Peter Nerbun
*Attorney, Agent, or Firm*—David L. Davis; Robert E. Smith; Edward L. Bell

[57] ABSTRACT

A sewing machine is disclosed which includes at least one regulatable operating instrumentality, such as, for example, an adjustable needle thread tensioner. Means are provided for generating signals indicative of different parameters which affect the ultimate overall stitch, such as, for example, fabric thickness at the seam, thread type, and pattern type. A central processor is provided with an algorithm for controlling the thread tension so as to maintain uniform stitch quality as a function of the different parameters.

7 Claims, 5 Drawing Figures

THREAD TENSIONS ACCORDING TO INPUT PARAMETERS

Fig. 4

| INPUT PARAMETERS | | | TENSION CODE | DUTY CYCLE (32 NDS) | TENSION (GRAMS) | | | |
|---|---|---|---|---|---|---|---|---|
| THD. | THK. | PAT. | | | | | | |
| 0 0 | 0 | 0 | 01011 | 12 | 70 | | | |
| 0 0 | 0 | 1 | 01111 | 16 | 150 | | | |
| 0 0 | 1 | 0 | 01111 | 16 | 150 | | | |
| 0 0 | 1 | 1 | 10011 | 20 | 390 | | | |
| 0 1 | 0 | 0 | 01100 | 13 | (A) | 50 | (B) | 40 |
| 0 1 | 0 | 1 | 10100 | 21 | (A) | 160 | (B) | 165 |
| 0 1 | 1 | 0 | 10001 | 18 | (A) | 110 | (B) | 110 |
| 0 1 | 1 | 1 | 10101 | 22 | (A) | 180 | (B) | 180 |
| 1 0 | 0 | 0 | 10011 | 20 | (C) | 115 | (D) | 115 |
| 1 0 | 0 | 1 | 11000 | 25 | (C) | 195 | (D) | 210 |
| 1 0 | 1 | 0 | 11000 | 25 | (C) | 195 | (D) | 210 |
| 1 0 | 1 | 1 | 11100 | 29 | (C) | 320 | (D) | 310 |
| 1 1 | 0 | 0 | 10010 | 19 | (E) | 85 | (F) | 135 |
| 1 1 | 0 | 1 | 11001 | 26 | (E) | 180 | (F) | 260 |
| 1 1 | 1 | 0 | 11010 | 27 | (E) | 210 | (F) | 280 |
| 1 1 | 1 | 1 | 11100 | 29 | (E) | 250 | (F) | 330 |

| CODE | THREAD TYPE |
|---|---|
| 0 0 | "A" SILK |
| 0 1 | (A) T.N.T; (B) DUAL DUTY |
| 1 0 | (C) POLYPLUS; (D) POLYSPUN |
| 1 1 | (E) H.D. MERC.; (F) B.H. TWIST "D" SILK |
| CODE | MATERIAL THICKNESS |
| 0 | 0 — .052" |
| 1 | .065" — .195" |
| CODE | PATTERN |
| 0 | NARROW BIGHT |
| 1 | WIDE BIGHT |

Fig. 5

ADAPTIVE SEWING MACHINE

BACKGROUND OF THE INVENTION

This invention relates to sewing machines and, more particularly, to an adaptive arrangement which regulates the operating instrumentalities of a sewing machine to maintain uniform stitch quality independent of varying parameters.

In recent years, domestic sewing machines have become increasingly automated in operation and increasingly versatile as well. For example, at the touch of a button a sewing machine operator may select any one of a large number of decorative stitch patterns which may then be automatically sewn by the sewing machine. Such a sewing machine is disclosed, for example, in U.S. Pat. No. 3,872,808. Although the sewing is done automatically to reproduce the desired pattern, the operator still retains a certain amount of control which affects stitch quality. For example, the operator can regulate the thread tension, the presser foot force, and the sewing speed. However, if the operator changes certain parameters, such as the type of fabric, the seam thickness, the type and thickness of thread, or the needle, without adjusting the thread tension, presser foot force, or speed, the stitch quality will change. Thus, a certain amount of experimentation, depending upon the skill of the operator, is required to adjust the thread tension, presser foot force, and sewing speed, in order to maintain uniform stitch quality when the above-mentioned parameters are varied.

It is therefore an object of this invention to reduce the skill necessary to operate the sewing machine effectively.

It is another object of this invention to reduce the number of controls on a sewing machine.

It is a further object of this invention to eliminate a large amount of detailed and highly technical instructions.

SUMMARY OF THE INVENTION

The foregoing and additional objects are attained in accordance with the principles of this invention by providing an adaptive machine for performing an operation on textile fabrics such as, for example, a sewing machine, which analyzes input parameters such as thread type, thread thickness, needle size, and fabric thickness, and based on pre-programmed information and the selected pattern sets and maintains critical machine functions such as thread tension, presser foot force, and maximum sewing speed so as to attain uniform stitch quality.

In accordance with an aspect of this invention, the input parameters are provided in the form of operator generated input signals.

In accordance with another aspect of this invention, at least some of the parameters are directly sensed by the machine.

In accordance with a further aspect of this invention, the machine is provided with a pre-programmed set of operational characteristics which provides a preset level of stitch quality.

In accordance with a further aspect of this invention, the set of operational characteristics is provided by operating the machine in a learning mode.

BRIEF DESCRIPTION OF THE DRAWING

The foregoing will be more readily apparent after reading the following description in conjunction with the drawing in which:

FIG. 4 is a table showing the relationship between the different input parameter codes and the resultant thread tension for the illustrative embodiment shown in FIG. 3; and FIG. 5 is a table showing an illustrative input parameter coding.

DESCRIPTION

Figure 1:
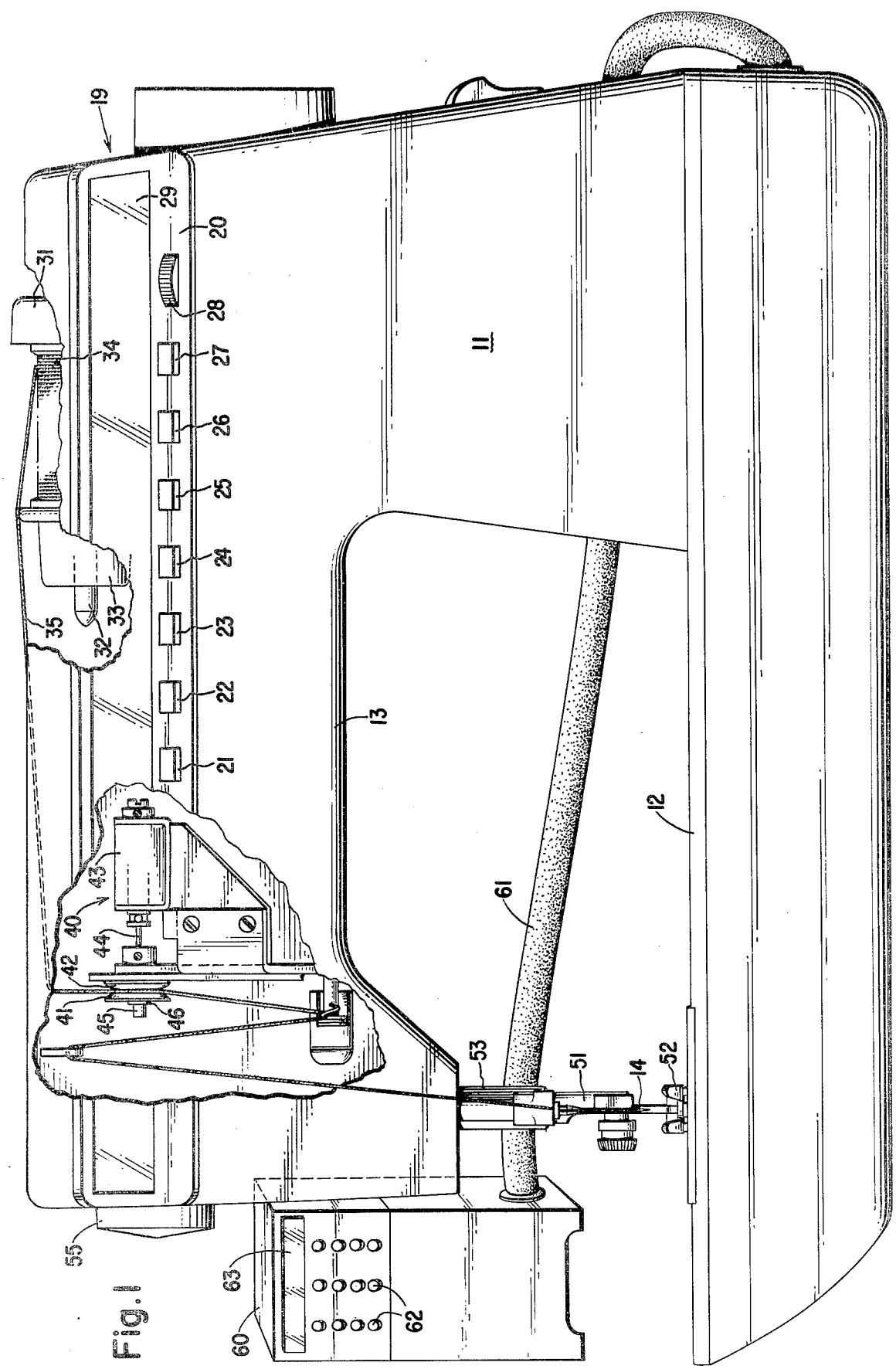
FIG. 1 depicts a sewing machine, partially broken away, coupled to a central processor unit in which the principles of this invention may be applied.

Referring now to the drawing, FIG. 1 illustrates a sewing machine 11 with a frame including a work supporting bed 12 and a bracket arm 13 overhanging the bed 12. Stitch forming instrumentalities carried in the frame include a needle 14 capable of being endwise reciprocated and laterally jogged to form zig zag stitches and a work feed dog (not shown) operating upwardly through slots formed in a throat plate on the bed 12 to transport the work across the bed 12 between needle penetrations. The pattern of stitches produced by operation of the sewing machine, i.e., the positional coordinates of each stitch penetration, may be influenced, for example, by data stored in a memory unit, as disclosed in U.S. Pat. No. 3,872,808, which is incorporated herein by reference.

Briefly, the subject matter of the above-referenced patent includes means for controlling the lateral jogging of the needle 14 and/or the direction and magnitude of feed motion of the work feed dog in response to electronic stitch pattern data extracted from a solid state read only memory carried in the sewing machine frame. The referenced patent discloses an approach for selection of any specific one out of a plurality of different groups of stitch position coordinate pattern data stored in the memory, which approach is compatible with the present invention and which involves the choice of any particular pattern by selective identification of the address of the starting word of the pattern in the memory.

The bracket arm 13 of the sewing machine is preferably fitted with a control assembly 19 which may be constructed in accordance with that disclosed in U.S. Pat. No. 3,913,506, which is incorporated herein by reference. Preferably, the control assembly 19 includes an escutcheon plate 20 through which a plurality of pattern selection push-buttons 21–27 and a pattern selection dial switch 28 protrude. A transparent insert 29 is provided through which indicia in close association with the selector push-buttons 21–27 is visible.

The sewing machine 11 also includes a spool holder 31 including a spindle member 32 and a cap member 33 for holding a spool of thread 34 in a conventional manner. As will be subsequently described with reference to FIG. 3, the spool holder 31 includes sensor elements and is adapted to cooperate with indicia on the spool 34 to provide signals indicative of the type of thread on the spool 34. Thread from the spool 34 passes through a thread handling system of conventional design and through the eye of the needle 14 in a conventional manner.

The thread handling system includes a thread tensioner comprising a pair of tension discs 41 and 42 controlled by a tension actuator mechanism having a solenoid 43 as its operative element. The plunger 44 of the solenoid 43 is coupled in a conventional manner to a rod member 45 which passes through openings in the tension discs 41 and 42 and is held against the disc 41 by a retaining ring 46. As will be described in more detail hereinafter, the tension on the thread 35 is controlled by the selective energization of the solenoid 43.

Also included in the sewing machine 11 is a presser bar 51 having a presser foot 52 at its lower end which operates in a conventional manner to maintain the fabric being stitched in contact with the work feed dog in the bed 12. As will be described hereinafter with respect to FIG. 3, presser bar 51 is endwise movable within a collar 53. A sensor (not shown in FIG. 1) is arranged on the collar 53 and cooperates with indicia on the presser bar 51 to provide a signal indicative of the spacing between the presser foot 52 and the work supporting bed 12, which spacing corresponds to the thickness of fabric being sewn.

Also included in the sewing machine 11, the operation of which will be described in more detail hereinafter, is a tension override control knob 55 which may be utilized by the sewing machine operator to manually control the operation of the thread tension actuator mechanism 40.

In accordance with the principles of this invention, a control unit 60 is provided which is coupled to the sewing machine 11 through a cable 61. The control unit 60 includes an input keyboard 62 and a display 63 whereby an operator can provide input parameter information through the keyboard unit 62 and see such information displayed by the display 63. The control unit 60 includes a central processor unit 64 (FIG. 2) which accepts the input parameter values as its inputs and provides control signals for the tension actuator 40.

When sewing a seam in a work piece, the quality of the stitches in the seam is directly affected by the tension of the needle thread 35, the thickness of fabric being sewn, type of thread being utilized, as well as the type of stitching being performed. It has been found that for any particular combination of fabric thickness, thread type, and stitch pattern, a particular thread tension setting results in an optimum stitch quality. If any of the different parameters, such as for example, the material thickness, the type of thread, or stitch type, is changed without changing the thread tension, the stitch quality will deteriorate. Therefore, in accordance with the principles of this invention, the control unit 60 is provided for adjusting the thread tension for different combinations of the above parameters.

Figure 2:
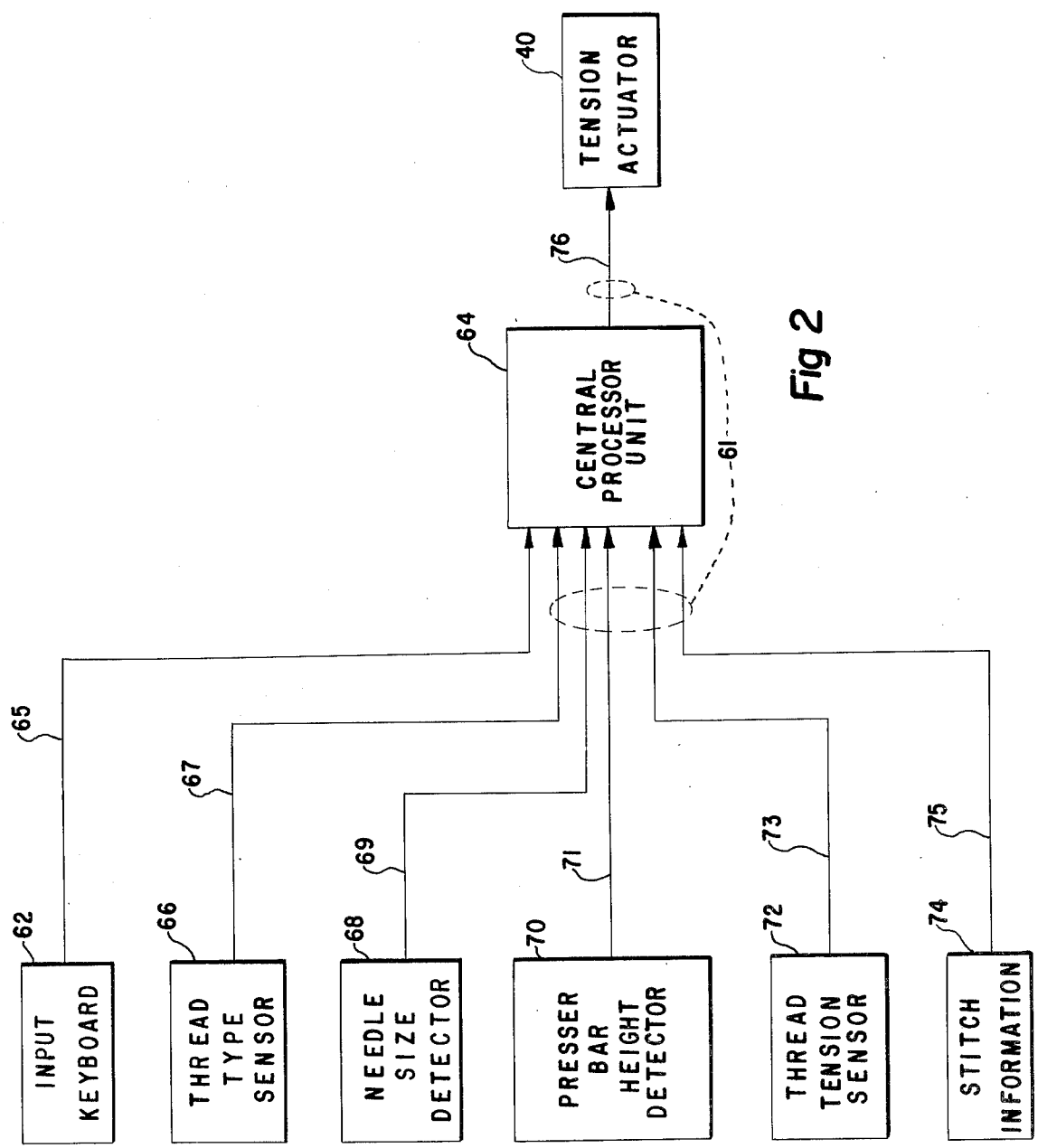
FIG. 2 depicts a block schematic diagram of a system for controlling needle thread tension in accordance with the principles of this invention.

Referring now to FIG. 2, shown therein is a block diagram of an arrangement for effecting control of the tension actuator 40 in accordance with different input parameters to achieve a desired level of stitch quality. The arrangement shown in FIG. 2 includes a central processor unit 64 and an input keyboard 62, both a part of the control unit 60 (FIG. 1). The central processor unit 64 accepts inputs from its input keyboard 62 via line 65, from a thread type sensor 66 via line 67, from a needle size detector 68 via line 69, from a presser bar height detector 70 via line 71, from a thread tension sensor 72 via line 73, and from a stitch information unit 74 via line 75, and provides control signals to the tension actuator 40 via line 76. Lines 67, 69, 71, 73, 75, and 76, are part of the cable 61 connecting the sewing machine 11 with the control unit 60 (FIG. 1). The thread type sensor 66 and the presser bar height detector 70 will be described in more detail hereinafter with respect to FIG. 3. The needle size detector 68 may be of conventional design and may include, for example, an optical reader sensitive to optical codes placed on the needle 14 or alternatively a magnetic sensor responsive to magnetic codes on the needle 14. The thread tension sensor 72 may likewise be of conventional design and may include, for example, a strain gauge unit mounted on one of the thread guides. The stitch information unit 74 may comprise, for example, the stitch pattern memory disclosed in the above-referenced U.S. Pat. No. 3,872,808, which memory includes coordinates of successive needle penetrations so that the central processor unit can determine the stitch size.

The central processor unit 64 is programmed with an algorithm, or set of operational characteristics, relating the different combination of input parameters to the desired thread tension. It is contemplated that the system disclosed herein may be operated in a variety of different modes of operation. In the first mode of operation, all of the input parameters are entered into the central processor unit 64 via the input keyboard 62 in accordance with a predetermined code. The central processor unit 64 then utilizes its pre-programmed set of operational characteristics to compute the signal to be applied to the tension actuator 40 via the line 76 in order to achieve the desired thread tension. In accordance with a second mode of operation, the input parameters are sensed via the sensors 66, 68, 70 and 72, and the central processor unit 64 utilizes the pre-programmed set of operational characteristics in the manner hereinbefore described. In a third mode of operation, an operator sets up the sewing machine 11 to achieve a desired stitch quality standard and the central processor unit 64 "learns" this standard from the manual operation of the sewing machine. The "learned standard" is substituted for the pre-programmed set of operational characteristics. Then if any of the parameters is varied, the central processor unit 64 utilizes this learned standard to control the thread tension. In all of the aforedescribed modes of operation, the central processor unit 64 can adjust the thread tension between successive stitches in accordance with information provided by the stitch information unit 74.

Figure 3:
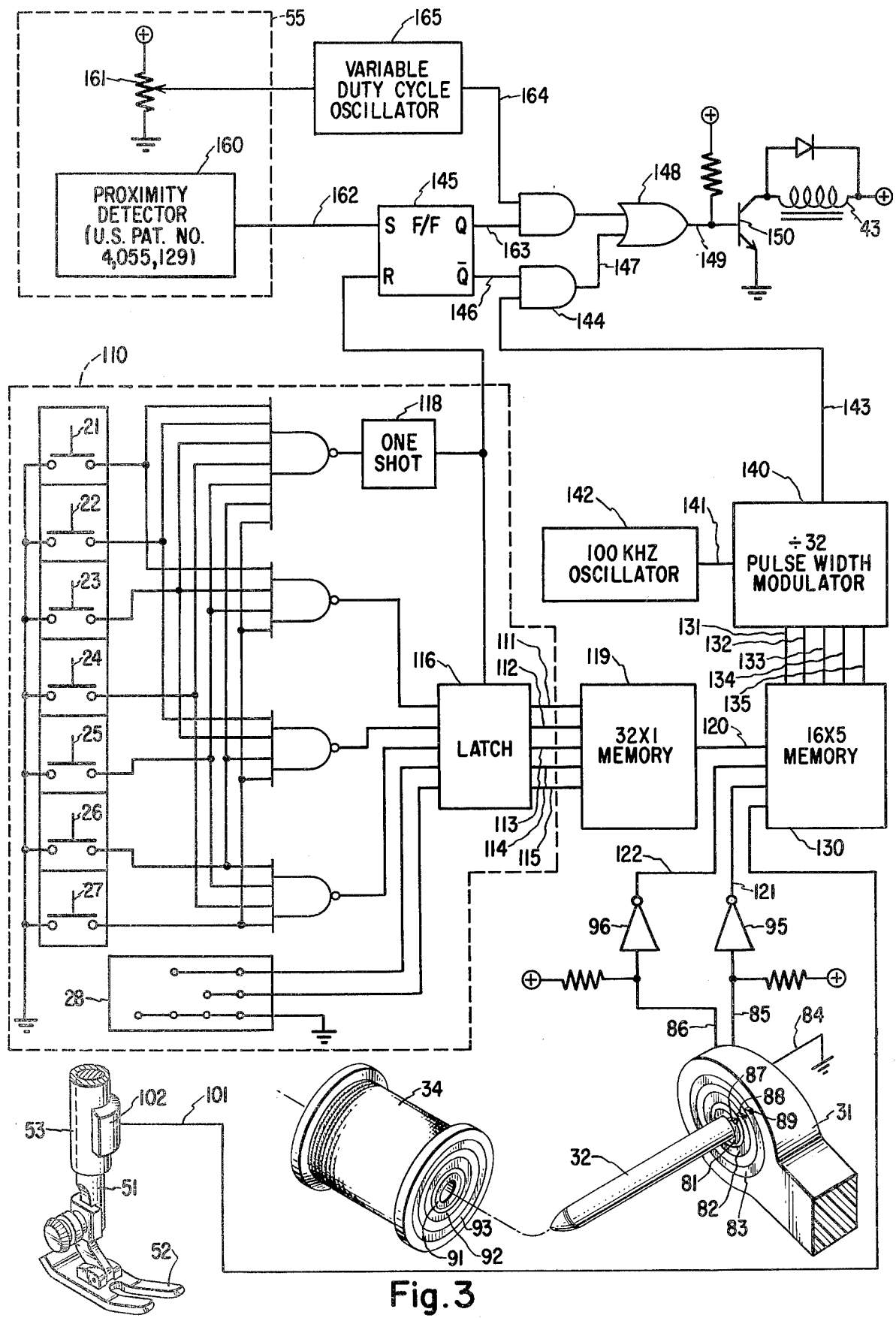
FIG. 3 depicts a schematic logic diagram of an illustrative embodiment for the system of FIG. 2.

Referring now to FIG. 3, depicted therein is a schematic logic diagram of an illustrative embodiment of an arrangement for controlling the thread tension in response to input signals indicative of thread type, material thickness, and selected stitch pattern. The thread type information is obtained by coding the spool 34 and providing a sensor on the thread holder 31. As shown in FIG. 3, the thread type sensor comprises three circular rings 81, 82 and 83 of conductive material mounted on the spool holder 31 and concentric about the spindle 32. The inner conducting ring 81 is connected via the lead 84 to ground, the middle conducting ring 82 is connected to the lead 85, and the outer conducting ring 83 is connected to the lead 86. Additionally, each of the conducting rings 81, 82 and 83 is provided with a standoff contact 87, 88 and 89, respectively. Cooperating with the aforedescribed sensor arrangement on the spool holder 31, the spool 34 is provided with indicia comprising a number of interconnected concentric circular conductive rings 91, 92 and 93 on one end thereof.

The type of thread on the spool 34 determines which of the rings 92 and 93 are present or absent from the end of the spool 34, in accordance with a predetermined code to be described in more detail hereinafter. When one of the rings 92 or 93 is present, the ring 91 must also be present. The rings which are present on the end of the spool 34 are interconnected. The presence or absence of the rings on the end of the spool 34 determines the selective application of a ground signal from the lead 84 to the leads 85 and 86 in accordance with a prescribed code. These signals are inverted by inverters 95 and 96, respectively. Alternatively, the Universal Product Code may be applied to the spool 34 and read by a conventional optical reader.

The material thickness input signal is provided on the lead 101 which is the output of a hall effect sensor 102 mounted on the collar 53 surrounding the presser bar 51. A magnet (not shown) is mounted on the presser bar 51 in such a position that with the material thickness below a certain dimension, there is a low level output from the hall effect sensor 102 on the line 101 and with the material thickness above that certain level, there is a high level output signal from the hall effect sensor 102 on the line 101.

The pattern selection input information is derived from the sewing machine pattern selector means 110, which is illustratively of the type disclosed in U.S. Pat. No. 3,913,506, the disclosure of which has been incorporated by reference herein. As disclosed in U.S. Pat. No. 3,913,506, depending upon the setting of the switch 28 and depending upon which of the pattern selection buttons 21-27 is depressed, a selected 5 bit digital code signal appears continuously on the output lines 111, 112, 113, 114, and 115, of the latch 116. Selection of a pattern also results in a pulse being generated on the line 117 from the one shot circuit 118. The output signals from the latch 116 on the leads 111-115 are applied as the address inputs to a memory 119. In accordance with the principles of this invention, the patterns are divided into groups having common characteristics which affect stitch quality. For illustrative purposes, the patterns are divided into two groups, those patterns having a relatively narrow bight and those patterns having a relatively wide bight. Therefore, for each pattern selection code on the leads 111-115, the memory 119 puts either a ONE or a ZERO on its output lead 120.

The parameter input signals, i.e., the thread type signals on the output leads 121 and 122 of the inverters 95 and 96 respectively, the material thickness signal on the lead 101, and the pattern type signal on the lead 120, are presented as address inputs to a memory unit 130. As will be described in more detail hereinafter with reference to FIG. 4, for each combination of input parameters, the memory 130 provides on its output leads 131, 132, 133, 134, and 135, a tension code signal.

At this time, a brief description of the control of the thread tension actuator mechanism 40 is in order. To control the tension on the thread 35, the solenoid 43 is alternately energized and deenergized at a relatively high frequency. The energization of the solenoid 43 pulls the tension disc 41 toward the tension disc 42, with the thread 35 being between the two tension discs 41 and 42. Since the energization signal for the solenoid 43 is at a relatively high frequency, the duty cycle of this signal, when averaged out with relation to the response time of the thread handling system, determines the actual tension applied to the thread 35. More particularly, as will be described hereinafter, it is the thread type combined with the duty cycle which determines the actual thread tension.

Returning now to the description of FIG. 3, the tension code signal on the leads 131-135 is applied to a divide by 32 pulse width modulator circuit 140 having another input on the lead 141 which is the output of a 100 kilohertz oscillator 142. The output of the modulator circuit 140 on the lead 143 is a signal of a frequency equal to 100 kilohertz divided by 32 and having a duty cycle determined by the binary number on the leads 131-135. For example, if the binary number on the leads 131-135 is 01100, equivalent to the number 12 in the base 10, the duty cycle of the signal on the lead 143 will be 13/32.

The high frequency duty cycle controlled signal on the lead 143 is applied as one of the inputs to the AND gate 144. The other input to the AND gate 144 is the $\bar{Q}$ output of the flip-flop 145 on the lead 146. It will be recalled that when a new pattern was selected, a pulse was applied to the lead 117 from the one shot circuit 118. This pulse reset the flip-flop 145 so that its $\bar{Q}$ output on the lead 146 is high. Therefore, the high frequency duty cycle controlled output signal from the modulator circuit 140 passes through the AND gate 144 to the lead 147, one of the inputs to an OR gate 148. The output of the OR gate 148 on the lead 149 is applied to the base of transistor 150. The transistor 150 is therefore turned on and off in accordance with the high frequency duty cycle controlled signal from the modulator 140. The collector of the transistor 150 is connected to one end of the solenoid 43, the other end of which is connected to a source of positive voltage. Thus, the circuitry shown in FIG. 3 automatically responds to a sensing of the thread type, the material thickness, and the selected pattern, to control the thread tension actuator mechanism 40 to maintain a desired level of thread tension resulting in a desired stitch quality.

It is also possible for the machine operator to desire to override the pre-programmed thread tension settings. To achieve this objective, a thread tension override control knob 55 is provided. As shown in FIG. 3, the override knob 55 includes a proximity detector 160 which may illustratively be of the type disclosed in U.S. Pat. No. 4,055,129, the disclosure of which is hereby incorporated by reference. Control knob 55 also includes a potentiometer 161. When an operator desires to override the pre-programmed thread tension settings, knob 55 is touched, causing a signal to be generated on the lead 162 by the proximity detector 160. This lead sets the flip-flop 145, placing a high signal on its Q output lead 163 and a low signal on its $\bar{Q}$ output lead 146. The low signal on the lead 146 disables the AND gate 144 and prevents the pre-programmed high frequency duty cycle controlled signal from controlling the energization of the solenoid 43. Instead, this energization is controlled by the signal on the lead 164 generated by variable duty cycle oscillator 165. Variable duty cycle oscillator 165 is designed to provide a signal on the lead 164 at a frequency equal to 100 kilohertz divided by 32, with the duty cycle of this signal being controlled by the setting of the potentiometer 161. The setting of the potentiometer 161 is controlled by rotation of override control knob 55. Thus, the circuitry shown in FIG. 3 has the capability of automatically controlling the thread tension in accordance with a pre-programmed set of operational characteristics depending upon sensed input parameters or, alternatively, controlling the thread tension under a manual override condition.

Referring now to FIG. 4, shown therein is a table of an illustrative set of operational characteristics which may be pre-programmed into the memory 130 (FIG. 3). At the left of the table shown in FIG. 4 are the different input parameter codes. The thread type is a two bit code (leads 121 and 122 of FIG. 3), the material thickness is a one bit code (lead 101 of FIG. 3), and the pattern type is a one bit code (lead 120 of FIG. 3). FIG. 5 is a table showing an illustrative input parameter coding. As may be seen from an examination of the table of FIG. 5, the thread code 00 denotes "A" silk thread; the thread code 01 denotes both TNT and dual duty threads; the thread code 10 denotes both polyplus and polyspun threads; and the thread code 11 denotes both heavy duty mercerized and buttonhole twist "D" silk threads. The material thickness code 0 denotes a material thickness less than 0.052 inch; and the material thickness code 1 denotes a material thickness between 0.065 and 0.195 inch. The pattern code 0 denotes a narrow bight stitch pattern and the pattern code 1 denotes a wide bight stitch pattern.

As shown in the table of FIG. 4, each of the sixteen combinations of input parameters, as denoted by a unique four bit input parameter code, corresponds to a particular tension code stored in the memory 130 (FIG. 3). Each tension code is a five bit binary number. The resultant duty cycle of the signal on the lead 143 (FIG. 3) to control the thread tension actuator mechanism 40 is the tension code number plus 1 divided by 32. This results in a tension (in grams) applied to the thread 35 as shown in the last column of FIG. 4. It is noted that for the thread tension codes 01, 10 and 11, there are two thread tensions for each tension code, one of the thread tensions corresponding to one of the threads having that particular thread code. It is further noted that a particular duty cycle results in different tensions depending upon the thread type. For example, a duty cycle of 29/32 provides a thread tension of 320 grams for polyplus thread, a tension of 310 grams for polyspun thread, a tension of 250 grams for heavy duty mercerized thread, and a tension of 330 grams for buttonhole twist "D" silk thread.

Accordingly, there has been disclosed an arrangement for controlling a sewing machine to maintain uniform stitch quality independent of varying parameters. It is understood that the above-described arrangement is merely illustrative of the application of the principles of this invention. Numerous other arrangements may be devised by those skilled in the art without departing from the spirit and scope of this invention, as defined by the appended claims.

Having thus set forth the nature of the invention, what is claimed herein is:

1. In a machine for performing an operation on a textile fabric:
    an operating instrumentality including regulatable means for influencing an operational characteristic of said machine;
    signal generating means for providing a parameter signal indicative of a predetermined parameter having an influence on said operational characteristic, said signal generating means including means for detecting the thickness of said fabric; and
    central processor means for accepting said parameter signal and controlling said instrumentality regulatable means in accordance with said parameter signal and a predetermined algorithm so as to maintain a desired standard for said operational characteristic of said machine.

2. In a machine for forming stitches in a textile fabric with thread:
    an operating instrumentality including regulatable means for influencing an operational characteristic of said machine;
    signal generating means for providing a parameter signal indicative of a predetermined parameter having an influence on said operational characteristic, said signal generating means including means for sensing the type of thread; and
    central processor means for accepting said parameter signal and controlling said instrumentality regulatable means in accordance with said parameter signal and a predetermined algorithm so as to maintain a desired standard for said operational characteristic of said machine.

3. A machine in accordance with claim 2 wherein said instrumentality regulatable means includes means for controlling the tension of said thread.

4. In a sewing machine having a support for work fabric to be stitched, stitch forming instrumentalities including a thread carrying needle adapted for endwise reciprocation to penetrate the fabric, a supply of thread for said needle, and a thread handling system for the thread disposed intermediate said supply and said needle, the improvement comprising:
    signaling means for providing a parameter signal indicative of a parameter which affects stitch quality including means for sensing the thickness of the fabric; and
    control means responsive to said parameter signal for controlling said thread handling system to maintain uniform stitch quality.

5. A machine according to claim 4 wherein the sewing machine includes a presser bar for maintaining the fabric in contact with said support and said sensing means includes means for sensing the height of said presser bar.

6. In a sewing machine having a support for work fabric to be stitched, stitch forming instrumentalities including a thread carrying needle adapted for endwise reciprocation to penetrate the fabric, a supply of thread for said needle, and a thread handling system for the thread disposed intermediate said supply and said needle, the improvement comprising:
    signaling means for providing a parameter signal indicative of a parameter which affects stitch quality; and
    control means responsive to said parameter signal for controlling said thread handling system to maintain uniform stitch quality;
    said parameter being thread type, said thread supply including a spool having thread wrapped thereabout and having indicia thereon indicative of the type of the thread wrapped about said spool, and said signaling means including means responsive to said indicia for providing said parameter signal.

7. A machine in accordance with claims 4 or 6 wherein said control means includes means for controlling the tension on the thread.

* * * * *